United States Patent
Leroux et al.

(10) Patent No.: US 12,452,678 B2
(45) Date of Patent: Oct. 21, 2025

(54) IDENTITY AND LOCATION CERTIFICATION BY MULTIFACTOR VERIFICATION BASED ON A CLOSED LOOP OF EXCHANGES

(71) Applicant: Orange, Issy-les-Moulineaux (FR)

(72) Inventors: Sylvain Leroux, Chatillon (FR); Thierry Gaillet, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 187 days.

(21) Appl. No.: 18/259,043

(22) PCT Filed: Dec. 1, 2021

(86) PCT No.: PCT/FR2021/052160
§ 371 (c)(1),
(2) Date: Jun. 22, 2023

(87) PCT Pub. No.: WO2022/136756
PCT Pub. Date: Jun. 30, 2022

(65) Prior Publication Data
US 2024/0048991 A1 Feb. 8, 2024

(30) Foreign Application Priority Data
Dec. 22, 2020 (FR) ...................... 2013989

(51) Int. Cl.
| | |
|---|---|
| *H04W 12/63* | (2021.01) |
| *H04L 9/08* | (2006.01) |
| *H04L 9/32* | (2006.01) |
| *H04L 9/40* | (2022.01) |
| *H04W 12/06* | (2021.01) |
| *H04W 12/084* | (2021.01) |

(52) U.S. Cl.
CPC ......... *H04W 12/63* (2021.01); *H04W 12/084* (2021.01); *H04L 9/0872* (2013.01); *H04L 9/32* (2013.01); *H04L 63/0492* (2013.01); *H04L 63/107* (2013.01); *H04W 12/06* (2013.01)

(58) Field of Classification Search
CPC ... H04W 12/63; H04W 12/084; H04W 12/06; H04L 9/0872; H04L 9/32; H04L 63/0492; H04L 63/107
USPC .......................................................... 726/4
See application file for complete search history.

(56) References Cited

U.S. PATENT DOCUMENTS

| | | | |
|---|---|---|---|
| 11,132,425 B1 * | 9/2021 | Cohen | ................ G06Q 20/4093 |
| 2011/0092185 A1 | 4/2011 | Garskof | |
| 2014/0115708 A1 | 4/2014 | Terwilliger et al. | |

(Continued)

OTHER PUBLICATIONS

International Search Report for International Application No. PCT/FR2021/052160 dated Mar. 9, 2022.

*Primary Examiner* — Thanh T Le
(74) *Attorney, Agent, or Firm* — Knobbe, Martens, Olson & Bear, LLP (57) ABSTRACT

A method and devices for certifying identity and location and a method and devices for managing access requests. A first verification relating to a location of a requester is carried out by a terminal upon reception of a code received by the terminal via at least one short-range telecommunication channel. A second verification relating to an identity of the requester is also triggered and carried out by the terminal. After these two verifications, an output signal is sent to an access management platform in order to trigger a requested access.

13 Claims, 3 Drawing Sheets

(56) References Cited

U.S. PATENT DOCUMENTS

| | | | |
|---|---|---|---|
| 2015/0281227 A1* | 10/2015 | Fox Ivey | H04L 9/3226 |
| | | | 713/168 |
| 2018/0103341 A1* | 4/2018 | Moiyallah, Jr. | G06F 3/04842 |
| 2018/0211188 A1* | 7/2018 | Bergdale | G07B 15/02 |
| 2019/0036940 A1* | 1/2019 | Balakrishnan | H04L 63/12 |
| 2019/0164165 A1* | 5/2019 | Ithabathula | G06F 21/34 |
| 2020/0099971 A1 | 3/2020 | Servignat et al. | |
| 2020/0186857 A1 | 6/2020 | Easley et al. | |
| 2021/0083877 A1* | 3/2021 | De Los Santos Vilchez | |
| | | | H04L 9/3234 |
| 2021/0288973 A1* | 9/2021 | Dimble | H04W 12/108 |
| 2022/0138746 A1* | 5/2022 | Rodriguez | G06Q 20/401 |
| | | | 705/43 |
| 2022/0247738 A1* | 8/2022 | Gahir | G06F 21/34 |
| 2023/0179589 A1* | 6/2023 | Kopack | H04L 63/18 |
| | | | 726/4 |
| 2023/0239291 A1* | 7/2023 | Kanga | H04L 63/0861 |
| | | | 726/4 |

* cited by examiner

IDENTITY AND LOCATION CERTIFICATION BY MULTIFACTOR VERIFICATION BASED ON A CLOSED LOOP OF EXCHANGES

CROSS-REFERENCE TO RELATED APPLICATIONS

This application is filed under 35 U.S.C. § 371 as the U.S. National phase of application No. PCT/FR2021/052160 entitled "IDENTITY AND LOCATION CERTIFICATION BY MULTI-FACTOR VERIFICATION BASED ON A CLOSED LOOP OF EXCHANGES" and filed Dec. 1, 2021, and which claims priority to FR 2013989 filed Dec. 22, 2020, each of which is incorporated by reference in its entirety.

BACKGROUND

Field

This development relates to the field of information systems security. More specifically, this development relates to a method for certifying the identity and location of a requester from which an access request originated relating to an information system or to a digital resource. It concerns a method for managing such an access request. This development also relates to devices configured to implement such a method. Such devices include, in a non-exhaustive manner, a computer program, a non-transitory storage medium, data processing circuits, a connected device, a terminal, a management platform for secure processing circuits, and an access management platform.

Description of the Related Art

In many fields, access to a service or to a device can be restricted according to a verifiable criterion, which is based on confidence in the identity or the geographical location of a user.

For example, a streaming platform can give access to multimedia content only to those users who have subscribed to a particular service. These users have an account accessible by password.

According to another example, a remote monitoring system can provide clarification in the event of an alarm being triggered. The customer is called on his or her mobile phone. If the customer maintains that the alarm was triggered by mistake, he or she is asked to enter a code to prove his or her identity.

According to another example, it is also possible to allow remote control of certain network devices of an industrial site. Access control based on IP address verification makes it possible to block certain malicious takeover attempts.

In another example, patient health data from a hospital may be stored on a server. As these data are sensitive by nature, it is possible to authorize access only to doctors physically present in this hospital. Access control via smart card can make it pos sible for example to verify the identity of the person requesting access to these data, or to verify their status as a doctor, or even to verify their physical presence in the hospital.

Currently, access control for sensitive data or sensitive information systems is mainly based on passwords or authentication tokens. It is known, for example, to use fixed or one-time passwords, in a grid or texted or sent by notification. It is also known, for example, to use software or hardware authentication tokens. However, the use of passwords or authentication tokens is vulnerable to multiple types of attack. With the aim of preventing identity theft attempts or "man-in-the-middle" circumvention attacks, certain access control mechanisms force users to take multiple voluntary actions of declaration and reassurance: this is the principle of multi-factor access control. There is therefore a need for an access control mechanism having a high level of security, with the equal possibility of being voluntary or passive.

Moreover, certain known access control mechanisms are also based on location verification via IP address, cellular network information, or packet analysis of local network traffic. Nevertheless, this type of verification offers many possibilities for circumvention, in particular via dynamic VPN. There is therefore also a need for reliable verification of the location of a person or device requesting access to data or to a sensitive device.

It is also desirable to limit access as much as possible to the certificates involved in authentication and access control. Indeed, certificates and important data can be compromised if they are, for example, stored directly on user terminals.

SUMMARY

This disclosure improves the situation.

A method is proposed for certifying the identity and location of a requester from which an access request originated relating to access to a digital resource or relating to access to a connected device in order to control an operation, the method being implemented by a terminal associated with the requester, the method comprising:
upon reception of a code received through at least one short-range telecommunications channel, a first verification, on the basis of the code, of a location of the requester, and a second verification relating at least to an identity of the requester; and
after the first verification and the second verification, transmission of an output signal towards an access management platform for the purposes of triggering the requested access.

"Requester" is understood to mean either a natural person or a device making an access request. The identity of the requester can designate either the identity of the natural person from whom the access request originated or an identifier associated with the device from which the access request originated.

"Terminal associated with the requester" is understood to mean a terminal having an identifier linked to the identity of the requester, and for which the current location is equivalent to that of the requester.

In the above method, the first verification concerns the location of the requester. Reception of the code by the terminal is conditional on the current location of the terminal being close to that of a transmitter having sent the code. From the code, it is therefore possible for the terminal to verify, for example, whether the current location of the requester corresponds to an expected location.

The second verification concerns at least the identity of the requester. The identifier of the terminal can for example be compared with a database of authorized identifiers, in order to verify whether the identity of the requester corresponds to an expected identity.

The terminal may comprise a secure processing circuit, the second verification relating to at least one identity of the requester being implemented in the secure processing circuit.

In this case, the method is even more secure.

The terminal may comprise, in addition to the secure processing circuit, a main processing circuit at least partially managing a first application and the method may comprise a decoding of the code by the first application, the decoding triggering the first verification implemented by the first application.

The secure processing circuit may at least partially manage a second application implementing the second verification. The method may further comprise, after the first verification, implementation of the second verification by the second application upon receiving an indication certifying reception of the code or certifying the first verification.

For example, provision may be made so that the decoding of the code by the first application triggers the sending of such an indication to the second application. Alternatively, provision may be made so that the location verification by the first application triggers the sending of such an indication. Thus, a dialogue between the first application and the second application makes it possible to carry out the double verification of the requester's location and identity. It is thus possible, for example, after receiving the code, to trigger verification of the requester's location and then, only once this first verification has been carried out, to trigger verification of the identity of the requester, via a dialogue between the first application and the second application. In this manner, an order in which the verifications are implemented by the terminal is imposed, and no identity verification is carried out if the requester's location is not as expected. An advantage is therefore to call upon the secure processing circuit as little as possible.

Conducting location verification and identity verification using two separate processing circuits, rather than using a single processing circuit, in general constitutes an additional element of security.

Different meanings for the expression "access request" are presented below in relation to different contexts for applying the above generic method. For example, it is possible to define a geographical area and rules governing the access control in connection with that geographical area. An example of such a rule can be that a user device which has issued an access request, or a target device to which access is requested, must be located in such a geographical area. Assuming the position of the transmitter of the first signal is known and is located in such a geographical area, then the reception of the first signal by the terminal demonstrates its presence in said geographical area.

It can be seen this example that, in general, the access request can relate for example to an access to a connected device in order to control an operation, for example to assume partial or complete control.

In addition, it is possible to define for example a list of natural persons or devices and rules governing the access control in connection with this list. An example of such a rule can be that access to a digital resource can only be authorized to natural persons who have subscribed to a given service, or to devices designated in advance by these natural persons. Verification of the identifier by the secure processing circuit, for example via the second application, makes it possible to certify the identity of a particular natural person or of a particular device, with a very high level of security.

It can be seen from this example that, in general, the access request can concern for example access to a digital resource, i.e. a file, a folder, or an information system.

Other additional rules may be set. For example, time restrictions on access can be set at the access platform, which for example can thus automatically reject any access request made outside a predefined access period.

Transmission of the first signal can be triggered in various ways.

For example, transmission of the first signal can be triggered upon reception of the access request. This has the particular advantage of energy optimization and bandwidth optimization via the short-range communication channel, as the first signal is only sent occasionally in response to an access request.

For example, the method can comprise a recurring transmission of the first signal. Such a recurring transmission in particular allows the transmission of the first signal to be passive and independent of the reception of the access request. Such a recurring transmission can be implemented autonomously by the transmitter of the first signal, without the need for connection to any communication network, which further improves the access control security. Thus, by means of this recurring and autonomous transmission, it is possible to certify the identity and the current location of a natural person or of a device even before this natural person or this device has issued the access request.

For example, the second verification may not only relate to the requester's identity but may also relate to an additional verification of the requester's location, as a supplemental element of reassurance. It is known in particular that a secure processing circuit such as a SIM card can certify its geographical location at the country level, for example by means of an exchange with a remote platform for managing secure processing circuits, managed for example by a telephone carrier.

For example, the second verification can comprise a determination of an authentication token certifying at least the second verification and furthermore capable of certifying the first verification, and the output signal can be indicative of the authentication token.

Thus, the output signal can characterize the fact that the requester's identity, and optionally the requester's location, are certified, and the access management platform can analyze the output signal to extract the authentication token or an indication of the authentication token and, on this basis, can trigger a requested access.

According to another aspect, a method is proposed for managing an access request from a requester and relating to access to a digital resource or relating to access to a connected device in order to control an operation, the method being implemented by a management system comprising a connected device, a terminal comprising a secure processing circuit, and an access management platform, the method comprising:
reception, by the connected device, of the access request,
transmission of a code, sent through at least one short-range telecommunications channel, towards the terminal,
certification of the requester's identity and location by the terminal according to the above certification method, and
reception, by the platform, of an output signal coming from said terminal, and triggering by the platform of the requested access on the basis of the output signal received.

This allows an access request received by a connected device to be processed, not exclusively at the connected device or exclusively on the basis of an exchange between the connected device and a platform with no intermediate device, but on the basis of a double verification conducted by a terminal associated with the requester who made the access request.

Involving a terminal associated with the requester in the management of the access request and verifying the current location of the requester on the basis of a code sent through a short-range communication channel prevents many types of attempts to circumvent location and identity verifications.

The above method can be enhanced with additional reassurance mechanisms.

For example, transmission of the first signal can be implemented by at least one transmitter towards a plurality of receivers, each receiver being a terminal comprising a main processing circuit and a secure secondary processing circuit. Each terminal can thus, independently, provide an element of reassurance based on the geographic location of the terminal relative to that of the transmitter of the first signal. Access control can thus be triggered for example only if each of these elements of reassurance is positive. In addition, an alert indicating a risk of compromise can be triggered if one of these elements of reassurance is negative.

For example, transmission of the first signal can be implemented by at least one transmitter towards at least one receiver through a transmission chain formed by at least one intermediate transmitter having a reception module configured for receiving the first signal and having a transmission module configured for retransmitting the first signal via the short range communication channel.

This makes it possible, for example, to authorize remote control of a target terminal on condition that the current location of the target terminal is close to that of a transmitter of the first signal.

If, in addition, at least one intermediate transmitter in the above transmission chain is a terminal comprising a main processing circuit and a secure secondary processing circuit, then this intermediate transmitter can also provide an additional element of reassurance based on the geographic location of the intermediate transmitter.

The above method is based on a closed loop of exchanges between different entities, namely at least one transmitter of the first signal, at least one terminal equipped with two separate processing circuits, and at least one access control platform.

Each of these entities is able to be configured independently so that all of these entities can exchange information and thus implement the above method.

In this context and in a generic manner, according to another aspect, a computer program is proposed comprising instructions for implementing the above method when the program is executed by a processor. Also proposed is a non-transitory computer-readable storage medium on which is stored a program for implementing the above method when the program is executed by a processor.

According to another aspect, a terminal is proposed that is configured for:
certifying an identity and location of a requester from which an access request originated relating to access to a digital resource or relating to access to a connected device in order to control an operation:
by carrying out, upon reception of a code received through at least one short-range telecommunications channel, a first verification of the requester's location, on the basis of the code,
by carrying out a second verification relating at least to the requester's identity and implemented in the secure processing circuit; and
after having carried out the first verification and the second verification, sending an output signal towards an access management platform for the purposes of triggering the requested access.

The terminal may comprise a main processing circuit and/or a secure processing circuit.

For example, such a main circuit can be configured to at least partially manage a first application implementing at least the first verification upon reception of the code by the terminal.

For example, such a secure processing circuit can be configured to at least partially manage a second application implementing at least the second verification, upon reception of the code by the terminal or after implementation of the first verification by the first application.

In one exemplary embodiment, the first application implements a decoding of a code received by the terminal, through at least one short-range telecommunications channel, and a first verification, on the basis of said code, of a location of a requester from whom an access request originated relating to access to a digital resource or relating to access to a connected device in order to control an operation. The first application may also notify the second application by means of a first indication confirming said reception of the code and/or confirming said first verification. Following this notification, i.e. upon reception of such an indication, the second application implements the second verification and generates a second indication confirming said second verification. Such a second indication can be used to notify the first application. In addition, the first indication and/or the second indication can be sent by the terminal to an access management platform. This makes it possible to certify, for the platform, that the first and second verifications have been carried out and thus to trigger, on this basis, a requested access.

According to another aspect, a secure processing circuit of the above terminal is proposed. The secure processing circuit is configured to implement a second verification relating at least to an identity of a requester from whom an access request originated relating to access to a digital resource or relating to access to a connected device in order to control an operation, said second verification being implemented upon reception of an indication confirming the reception, by the terminal, of a code through at least one short-range telecommunications channel, or confirming a first verification of a location of the requester on the basis of said code.

According to another aspect, a main processing circuit of the above terminal is proposed. The main processing circuit is configured to at least partially manage a first application, said first application implementing a decoding of a code received by the terminal through at least one short-range telecommunications channel, and a first verification, on the basis of said code, of a location of a requester from whom an access request originated relating to access to a digital resource or relating to access to a connected device in order to control an operation.

According to another aspect, a system is proposed for managing an access request coming from a requester and relating to access to a digital resource or relating to access to a connected device in order to control an operation, the system comprising:
the above terminal, a connected device configured to receive an access request, and an access management platform configured to receive an output signal coming from said terminal and to trigger, in response, the requested access.

According to another aspect, a connected device of the above system is proposed.

According to another aspect, an access management platform of the above system is proposed.

BRIEF DESCRIPTION OF THE DRAWINGS

Other features, details, and advantages will become apparent upon reading the detailed description below, and upon analyzing the appended drawings.

DETAILED DESCRIPTION OF CERTAIN ILLUSTRATIVE EMBODIMENTS

The object of the development is to ensure that an access request in order to access a particular service, or a command or action intended for a particular device, does indeed come from a source whose identity corresponds to an authorized identity, physically located in a predefined location. It is optionally possible to ensure that the moment at which this command or action was issued is indeed within a predefined time period. One targeted aim is to minimize cyber attack threats.

It is thus proposed to control access to this particular service or to this particular device through a closed loop of exchanges between a plurality of entities, including at least one connected device, a terminal, and an access control platform, via a system of multiple reassurances. The exchanges between these entities are implemented via different telecommunication channels, including at least one short-range telecommunication channel associated with the predefined location.

Many applications are possible, in particular in remote monitoring services and multimedia content streaming services, in the industrial sector or in the medical sector. The development can be implemented in many types of places, by or for many types of organizations, for example a household, a company, an administration, a university campus, a factory, a lobby, a hallway, or a waiting room. We now refer to FIG. 1, which illustrates one exemplary implementation of a generic system for managing an access request.

Figure 1:
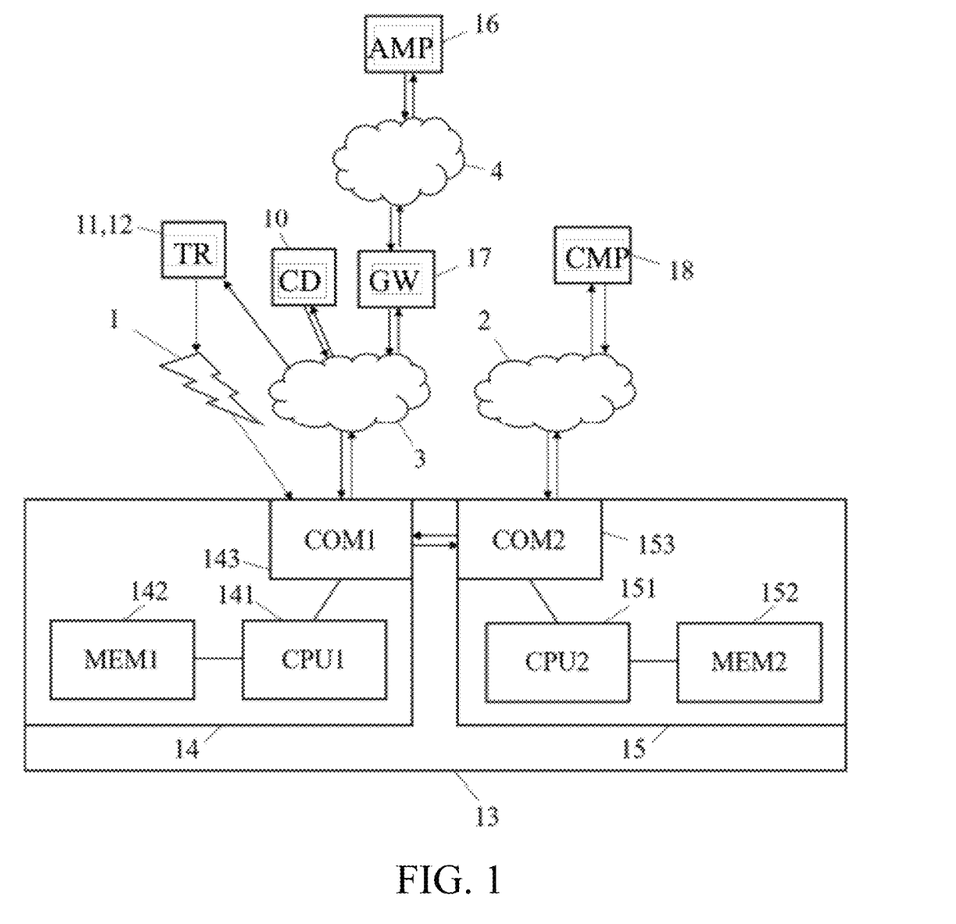
FIG. 1 illustrates a generic system for managing an access request, in one exemplary embodiment of the development.

The system in question comprises the following entities:
 a network gateway 17 between a local area network 3 and a wide area network 4, through which two-way communication with an access management platform 16 can be carried out,
 a transmitter 11, 12 connected to local area network 3 and configured to transmit a first signal via a short-range communication channel 1,
 a connected device 10 connected to local area network 3 and configured to receive an access request and to control transmitter 11, 12, and
 a terminal 13.

Terminal 13 comprises a first processing circuit 14 and a second processing circuit 15.

First processing circuit 14 or main processing circuit comprises a processor 141, a memory 142, and a communication interface 143 which connects terminal 13 to local area network 3, is capable of managing two-way communications with second processing circuit 15, and is further configured to receive the first signal via short-range communication channel 1.

Second processing circuit 15 or secure processing circuit comprises a processor 151, a memory 152, and a communication interface 153 capable of managing two-way communications with first processing circuit 14 and configured in addition to exchange information, via a dedicated network 2, with a management platform 18 for secure processing circuits.

Figure 2:
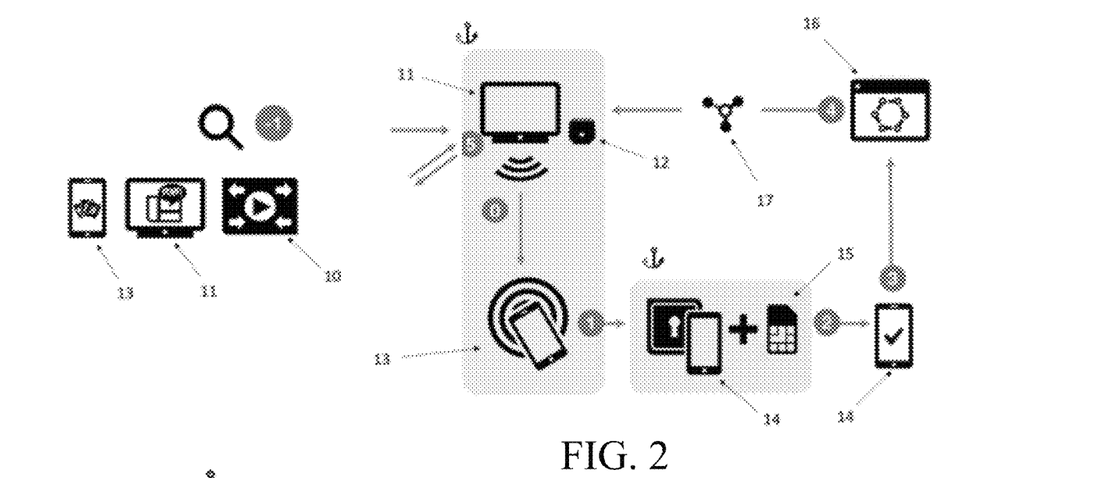
FIG. 2 illustrates a particular system for managing an access request in order to access multimedia content, in the context of a residential setup in one exemplary embodiment of the development.

Reference is now made to FIG. 2, which illustrates one particular exemplary implementation of a system for managing an access request in order to access a service for real-time streaming of multimedia content.

Various entities are represented in FIG. 2 and are described below.

A TV decoder is represented as an example of a connected device 10 having a data processing module that can be associated with a human-machine interface. It can be for example an application programming interface comprising an infrared signal reception module coupled to a remote control equipped with an infrared emission module. Alternatively, the application programming interface may comprise a voice recognition module associated with a loudspeaker as an input device. The human-machine interface allows a user to enter commands, such as commands for searching for and selecting multimedia content, which are processed by the data processing module. Connected device 10 further comprises a communication interface for controlling an operation of at least one short-range signal transmitter 11, 12, such as a visual signal transmitter 11 or a sound signal transmitter 12. Such transmitters can for example be included in playback devices such as a television and/or a loudspeaker, for example to display feedback to the user's commands, or to emit signals at short range. Mention can be made, for example, of the transmission of visual signals for optical communication in open space, for example according to known technologies such as Li-Fi or OCC. It is also possible to emit visual signals such as QR codes or their variants, or other short-range signals, for example sound signals or ultrasonic signals.

"Short-range signals" is understood to mean signals usually detectable within a radius of a few meters or a few tens of meters around the transmitter, i.e. an area the size of a room or a dwelling, for example. In many situations, given the ambient noise and the presence of absorbing obstacles such as walls, a Li-Fi signal or an emitted ultrasound signal is essentially imperceptible beyond a radius of a few meters from the transmitter.

In certain embodiments, the communication interface can also make it possible, downstream, to control one or more playback devices so as to play the requested multimedia content once the streaming of this content has been triggered.

A television and a loudspeaker are represented as examples of playback devices that are respectively visual and audio. These devices are equipped with a transmitter 11, 12 of short-range signals controllable by the TV decoder, in this case a transmitter 11 of visual signals or a transmitter 12 of sound signals.

A multifunction mobile telephone, also designated by the term "smartphone", is represented as an example of a terminal 13 equipped with a first processing circuit or main processing circuit 14, for example a system on a chip comprising in particular memory, one or more microprocessors, and interface devices, including a receiver for said short-range signals and a transmitter for radio signals. Terminal 13 is also equipped with a second processing circuit or secure processing circuit 15 that is distinct from the main processing circuit. This is for example a SIM card which can be physical, or, in the case of the eSIM specification, virtualized. The main processing circuit and the secure processing circuit are able to communicate with each other, and are both able to store data and applications of a user, its carrier, or third parties.

In certain embodiments, connected device 10 and main processing circuit 14 of terminal 13 can designate the same entity.

An access management platform 16 for managing access to multimedia content is represented and in this case designates an entity, for example a remote server or a set of remote servers, responsible for triggering the streaming of multimedia content upon request after verification of the required authorizations.

A network gateway 17 is represented as a network device capable of receiving the multimedia content for which streaming was triggered by platform 16, and capable of transmitting it, via a local network, to any entity, such as connected device 10, the visual playback device comprising visual signal transmitter 11, the sound playback device comprising sound signal transmitter 12, or terminal 13 which were all mentioned above, with a view to playing this multimedia content for the user on a medium of his or her choice.

Figure 3:
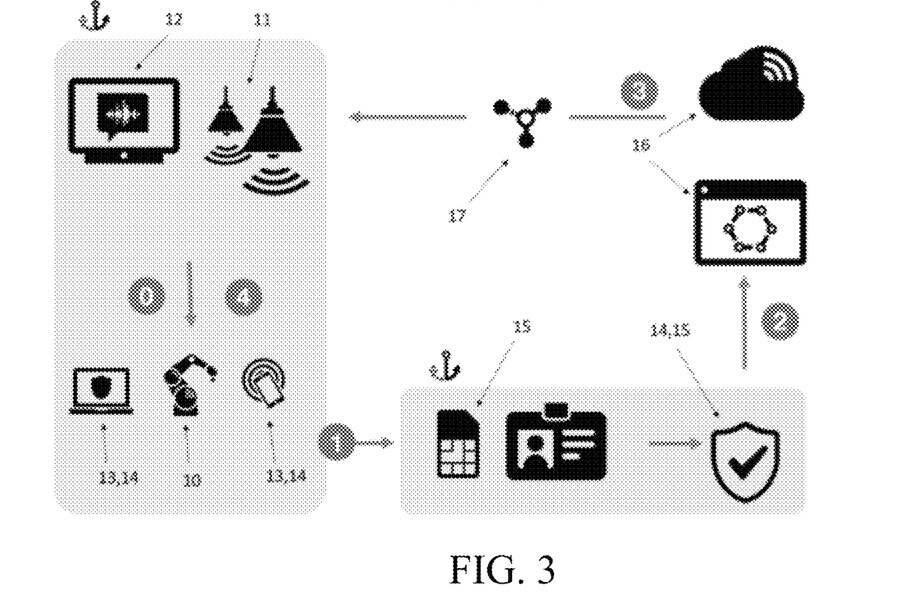
FIG. 3 illustrates a particular system for managing an access request in order to access industrial equipment, according to another embodiment of the development.
Figure 4:
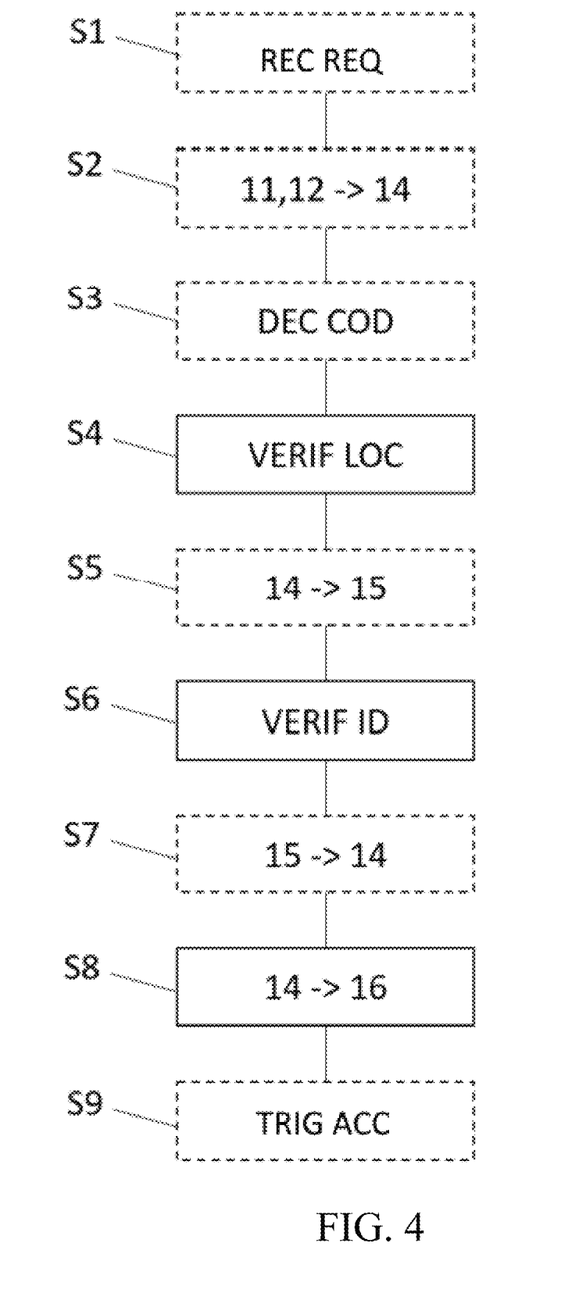
FIG. 4 illustrates a method for managing an access request, in one exemplary embodiment of the development.

Reference is now made to FIG. 4 which illustrates a method for managing an access request, applicable to any one of the systems represented in FIGS. 1 to 3. In the following paragraphs, reference is made more particularly to applying the method of FIG. 4 to the system represented in FIG. 2.

A user, who is a natural person, searches for and selects multimedia content to be streamed. This search and this selection are carried out at connected device 10 and are equivalent to the reception S1, by connected device 10, of a request for access to the multimedia content selected by the user.

It is also assumed that the multimedia content in question is available by subscription to a streaming service, and only for a given geographical area. This hypothesis is particularly suited to the field of digital rights management, as the rights associated with certain multimedia content, or more generally with certain digital works, are likely to be different from one country to another. It is therefore necessary, before granting access to the selected multimedia content, to check whether the user has actually obtained such a subscription as well as whether the user is physically in the given geographical area.

Conventionally, the user has an associated account, and connection information for this account in the form of an identifier and a password are requested from the user, before or after the content search and selection. When the connection information is required beforehand in order to access a catalog of multimedia content and thus to perform the search and selection, it is also possible, in a known manner, to rely on a model of user preferences. The search and selection process can thus be guided by recommending personalized content.

The geographical location of the user can be detected by various known methods, for example on the basis of an IP address associated with the connected device or on the basis of geographical information associated with the means of payment having been used to subscribe to the streaming service. Alternatively, the geographical location of the user can be provided on a declarative basis, the user being able to associate his or her account with a particular country where the user resides.

In order to have additional assurance concerning the user's identity and geographical location, the development also proposes implementing a series of data exchanges between the entities described above.

Connected device 10 can control the transmission, by one or more transmitters 11, 12, of at least a first signal via short-range communication channel 1. This first signal encapsulates a code. This transmission can be actively triggered, for example upon reception of the search and selection command, i.e. upon reception during step S1 of the request for access to the selected multimedia content. Alternatively, this transmission can be triggered passively, i.e. even in the absence of any prior search and selection command or any prior access request, and can be repeated for example in a recurring manner, for example at regular time intervals. The code can comprise various indications, such as an identifier of the connected device, an indication of the location of the signal transmitter, and/or an indication of a timestamp associated for example with the moment of transmission of the first signal.

During step S2, terminal 13 thus receives a code, contained in said at least one first short-range signal. The purpose of receiving this signal and the code encapsulated therein is to certify that playback device 11,12 which emitted the first signal and terminal 13 are located close to each other. The received first signal can then be processed by means of a first application at least partially managed by main processing circuit 14 of the terminal. More particularly, the first application can carry out a decoding S3 of the code received. This decoding corresponds to an extraction, from the first signal received, of the code it contains. Decoding S3 of the code triggers a series of verifications. A first verification S4 concerns the current location of the terminal, and therefore of the user. This first verification proceeds from the extracted code. Indeed, it is possible to provide different transmitters 11, 12 each transmitting a different code at a given moment via a short-range communication channel, so that the code extracted by terminal 13 at this given moment is indicative of the transmitter from which the code is sent, therefore indirectly of the current location of terminal 13. A second verification S6 is then carried out by secure processing circuit 15 of the terminal. According to one embodiment, second verification S6 is implemented by a second application at least partially managed by secure processing circuit 15. The second application is for example a Java application, known as a "Cardlet", executed by secure processing circuit 15.

Second verification S6 relates to the identity of the user and optionally includes one or more additional verifications relating for example to the current location of terminal 13. Second verification S6 can for example be triggered at the initiative of the first application. Indeed, decoding S3, or first verification S4, or any other operation which results from reception S2 of the code by terminal 13, can trigger transmission S5 of an indication confirming reception of the code or confirming the first verification. Said indication can be incorporated into a request coming from the first application and intended for the second application. This request may further comprise an indication aimed at specifically requesting a verification of the user's identity, and optionally a verification of the terminal's current location. Thus, this request can comprise information relating to an expected identity of the user. The request may optionally comprise information relating to an expected location of the terminal. The request may also comprise other information relating to any type of additional element of reassurance.

The second verification may involve a dialogue between secure processing circuit 15 and management platform 18 for secure processing circuits in order to verify a match between the identity of the user as derivable from a user identifier known to the management platform for secure processing circuits (for example an IMSI number), on the one hand, and the expected identity of the user, on the other hand. The verification may also involve determining whether the geographical area where terminal 13 is physically located, i.e. for example a geographical area corresponding to a country or to a region of a country, corresponds to the expected location for the terminal.

If the verification is positive, in step S7, the second application notifies the first application of an authentication token certifying said verification. The authentication token may for example be encrypted, encoded, and encapsulated in a digital signal.

The first application receives the authentication token and processes it in order to generate an output signal, or hereinafter "second signal", indicative of the authentication token. "Signal indicative of the authentication token" is understood to mean a signal comprising the authentication token, or comprising any information derived from processing this token, as data or as metadata.

In one embodiment, processing the authentication token can involve decoding and optionally decrypting a received signal encapsulating the authentication token. The aim of such processing can be to validate, at terminal 13, on the basis of the code extracted from the first signal and the authentication token received from the second application, that the real identity of the user is consistent with the expected identity. Optionally, such processing can have the additional effect of validating, still at the terminal, that the actual location of the terminal is consistent with the expected location. In such an embodiment, the second signal can comprise, as information derived from processing the authentication token, a simple indication of a positive verification.

Alternatively, in particular if the content of the signal coming from the second application is encrypted using a key unknown to the first application, this content comprising the authentication token can be directly incorporated, without alteration or risk of compromise, into the content of the second signal.

The first application then transmits this second signal in step S8, to access management platform 16.

The access management platform receives the second signal and processes it by triggering access, in step S9, to the requested multimedia content.

Returning to the embodiment in which the authentication token is encrypted by the second application and incorporated by the first application into the second signal, it is possible that the management platform has the encryption key known to the second application and is configured to perform the decoding and decryption of the authentication token, and on this basis to trigger access, in step S9, to the requested multimedia content.

The multimedia content in question is then transmitted, for example via a WAN network to the network gateway then via a LAN/WLAN network to any entity with a view to playback to the user on the medium of his or her choice.

For example, a client or a web browser configured to allow playing the multimedia content received from the network gateway can be installed beforehand on any device, such as, among the entities mentioned above, the visual or sound playback device or the connected device 10 controlling one or the other of these devices, or the main processing circuit 14 of terminal 13.

Reference is now made to FIG. 3, which illustrates one exemplary implementation of a method for controlling access to an industrial device located at an industrial site.

Industrial device can designate, for example, an information processing system such as a company server, a microcomputer, or a mobile terminal for use by a worker. In this example, the access referred to can designate access to a digital resource such as a file, a folder, a disk partition, or any other digital resource stored on the industrial device, or accessible from the industrial device once access is granted.

Alternatively, industrial device can designate a production unit, a measurement device, or a machine tool such as a robot. In this example, access can designate the implementation of a command or the execution of software, or more generally an assuming of control over the operation of the industrial device. For example, industrial device can designate a device controlling physical access to an area of the industrial site. In this example, access can for example designate implementation of an action such as a command to open, close, or lock a door.

In the exemplary implementation illustrated in FIG. 3, at least one monitor, display panel, control panel, lighting device, loudspeaker, or other example of a transmitter 11,12 physically present on the industrial site is controlled so as to passively transmit, in a recurring manner, a first short-range signal as defined above, in at least one predefined frequency band. This short-range signal contains, or encapsulates, a code.

Additionally or alternatively, such a first short-range signal can also be transmitted actively by at least one such transmitter 11,12 in response to the transmission of a request or of an action intended for the industrial device.

In certain embodiments, the industrial device is designed so as to be able to receive and process requests or actions received via its communication interface and previously issued from a terminal 13, or from a person interacting with such a terminal 13 by means of a human-machine interface.

Here, "terminal" 13 is understood to mean a device equipped with a main processing circuit 14 and a secure secondary processing circuit 15 that is distinct from main processing circuit 14. Main processing circuit 14 comprises at least one processor, at least one memory, a receiver for the short-range signals emitted by the at least one transmitter 11,12, and a communication interface for communicating with the secure processing circuit. Secure processing circuit 15 comprises at least one processor, at least one memory storing an identifier, typically encrypted, a communication interface with the main circuit, and a communication interface via radio signals with a management platform for secure processing circuits. The secure processing circuit is also capable of communicating with a business platform, as an example of an access management platform 16, via its communication interface by means of radio signals, or via its communication interface with the main circuit.

"Identifier" is understood to mean, for example, a machine identifier specifically associated with secure processing circuit 15 or a personal identifier associated with a particular user account.

In such a situation, it is important to be able to verify that terminal 13 is physically located within the industrial site, in order to guard against certain types of cyber attacks.

In certain embodiments, the industrial device has an integrated human-machine interface and can be designed so as to be able to receive and process requests or actions from a person interacting directly with said human-machine interface. In such a situation, for the reasons mentioned above, it is important to be able to verify the location of the person interacting with the industrial device. For this purpose, it is possible to provide that the industrial device has an associated terminal 13 as defined above and/or to require that the person also carries such an associated terminal 13 for the purposes of controlling access to the industrial device.

The industrial device is mentioned below as an example of a connected device 10 having a data processing module associated with a human-machine interface or with a communication interface, such interfaces being capable of receiving requests intended for connected device 10 or actions to be performed by connected device 10.

As for the description of the exemplary embodiment illustrated in FIG. 3, the function of the industrial device within the management of an access request is thus considered to be equivalent to the function of connected device 10 within the management of an access request in the exemplary embodiment illustrated in FIG. 2.

We also can refer again to FIG. 4, which illustrates a method for managing an access request applicable to any of the systems represented in FIGS. 1 to 3. In the following paragraphs, particular reference is made to applying the method of FIG. 4 to the system represented in FIG. 3.

Connected device 10, or in this case the industrial device, receives an access request in step S1. This access request originates from a requester, who may be either a natural person interacting with the human-machine interface of connected device 10, or any device transmitting the access request via the communication interface of connected device 10.

In step S2, terminal 13 receives the code contained in the first short-range signal sent, actively or passively, by at least one playback device 11,12. Reception of this first signal by the terminal confirms that the location of terminal 13 as the receiver is close to that of playback device 11,12 as the transmitter. This is a reassurance based on geographical criteria. After reception, the first signal is processed by a first application which is at least partially managed by main processing circuit 14, and which, optionally, is partially managed by a remote entity not shown in FIG. 3. Processing of the first signal by the first application comprises in particular in step S4 a first verification of the location of the requester, which may result from a decoding, in step S3, of the first signal in order to extract the code contained therein, or encapsulated. The processing of the first signal can also comprise the generation and sending, in step S5, of a request to secure processing circuit 15, in order to obtain the implementation of a second verification, in step S6, of at least the identifier stored in the memory of secure processing circuit 15. The request thus comprises information relating to an expected identifier, and may optionally further comprise information relating to an expected location of terminal 13.

The request is received and processed by a second application which is at least partially managed by secure processing circuit 15, and which, optionally, is partially managed by management platform 18 for secure processing circuits. Processing the request comprises the second verification, in step S6. This second verification at least relates to a match between the expected identifier and the identifier stored in the memory of secure processing circuit 15. Optionally, the second verification can further comprise an additional verification relating to a match between the expected location and the current location of the terminal. If the verification is positive, i.e. if the match is confirmed, the second application determines an authentication token certifying this verification. Secure processing circuit 15 then sends a second signal, which possibly travels in step S7 through main processing circuit 14, and is finally transmitted in step S8 to access management platform 16. This second signal encapsulates the determined authentication token or is indicative of the determined authentication token.

It is only after having received the second signal, then having extracted from this second signal the authentication token or the information indicative of the authentication token, and finally having validated the token or the extracted information, that access management platform 16 triggers, in step S9, the requested access to the industrial device.

The access request from terminal 13 can thus be actually accepted and access granted at the industrial device.

The development as described through the above examples allows many variants.

For example, the access control can be conditional to reception of the first signal, not only by a terminal where the reassurance on an identity criterion originated, but by a plurality of such terminals. This makes it possible to multiply weak and robust proof factors beyond a simple identifier, with the transmitter or transmitters of the first signal as central elements of reassurance which trigger in parallel multiple verifications of location and identity, and, if desired, of time.

For example, the first signal can be transmitted by a transmitter to the terminal, not exclusively via a short-range telecommunications channel but, in addition to the use of this short-range channel, via a transmission chain. Such a transmission chain comprises one or more intermediate transmitters having a reception module configured to receive the first signal and a transmission module configured to retransmit the first signal. Among these intermediate transmitters, at least the one located at the end of the chain, meaning the one retransmitting the first signal directly to the receiver of the terminal, is configured in such a way as to transmit specifically via the short-range communication channel. Optionally, several intermediate transmitters can be configured to communicate with each other via such a short-range communication channel. It is possible to take advantage of such a transmission chain to provide additional reassurance concerning the location of the terminal. Indeed, the intermediate transmitters can for example be configured so as to process the first signal before its retransmission, such that the first code comprises information indicative of the location of one or more intermediate transmitters or of the time of the retransmission of the first signal by one or more intermediate transmitters.

The invention claimed is:

1. A method of certifying an identity and location of a requester from which an access request originated relating to access to a digital resource or relating to access to a connected device,
the method being implemented by a terminal,
the method comprising:

upon reception of a code received through at least one short-range telecommunications channel, performing a first verification, on a basis of the code, of a location of the requester, and performing a second verification relating at least to the identity of the requester; and after performing the first verification and the second verification, transmitting an output signal towards an access management platform for purposes of triggering the requested access.

2. The method according to claim 1, wherein, the terminal comprising a secure processing circuit, the second verification relating to at least one identity of the requester is implemented in the secure processing circuit.

3. The method according to claim 2, wherein:
the terminal comprises, in addition to the secure processing circuit, a main processing circuit at least partially managing a first application, and
the method comprises decoding the code by the first application, the decoding triggering the implementation of the first verification by the first application.

4. The method according to claim 3, wherein, the secure processing circuit at least partially managing a second application, the method further comprises:
after performing the first verification, implementing the second verification by the second application upon receiving an indication certifying reception of the code or certifying the first verification.

5. The method according to claim 1, wherein performing the second verification further comprises performing an additional verification of the location of the requester.

6. The method according to claim 1, wherein:
performing the second verification comprises determining an authentication token certifying at least the second verification, and
the output signal is indicative of the authentication token.

7. A processing circuit comprising a processor and a memory, the memory storing program code instructions of a computer program for executing the method according to claim 1 when this computer program is executed by the processor.

8. A method of managing an access request from a requester and relating to access to a digital resource or relating to access to a connected device, the method being implemented by a management system comprising the connected device, a terminal comprising a secure processing circuit, and an access management platform,
the method comprising:
receiving, by the connected device, of the access request,
transmitting of a code, sent through at least one short-range telecommunications channel, towards the terminal,
certifying the identity and location of the requester by the terminal,
wherein the certifying comprises, upon reception of the code by the terminal through the at least one short-range telecommunications channel, performing a first verification, on a basis of the code, of a location of the requester, performing a second verification relating at least to an identity of the requester, and, after performing the first verification and the second verification, transmitting an output signal towards the access management platform for purposes of triggering the requested access, and
receiving, by the access management platform, of the output signal coming from the terminal, and triggering, by the access management platform, of the requested access on a basis of the output signal received.

9. A terminal configured to:
certify an identity and location of a requester from which an access request originated relating to access to a digital resource or relating to access to a connected device:
by performing, upon reception of a code sent through at least one short-range telecommunication channel, a first verification of the location of the requester, on a basis of the code,
by performing a second verification relating at least to the identity of the requester and implemented in a secure processing circuit; and
after having performed the first verification and the second verification, by sending an output signal towards an access management platform for purposes of triggering the requested access.

10. The terminal according to claim 9, the terminal comprising:
a main circuit configured to at least partially manage a first application, the first application implementing at least the first verification upon reception of the code by the terminal, and
a secure processing circuit configured to at least partially manage a second application, the second application implementing at least the second verification upon reception of the code by the terminal or after implementation of the first verification by the first application.

11. A terminal configured to:
certify an identity and location of a requester from which an access request originated relating to access to a digital resource or relating to access to a connected device:
by performing, upon reception of a code sent through at least one short-range telecommunication channel, a first verification of the location of the requester, on a basis of the code,
by performing a second verification relating at least to the identity of the requester and implemented in a secure processing circuit; and
after having performed the first verification and the second verification, by sending an output signal towards an access management platform for purposes of triggering the requested access, wherein the terminal comprises:
the secure processing circuit configured to at least partially manage a second application, the second application implementing at least the second verification upon reception of the code by the terminal or after implementation of the first verification by a first application at least partially managed by a main processing circuit.

12. A terminal configured to:
certify an identity and location of a requester from which an access request originated relating to access to a digital resource or relating to access to a connected device:
by performing, upon reception of a code sent through at least one short-range telecommunication channel, a first verification of the location of the requester, on a basis of the code,
by performing a second verification relating at least to the identity of the requester and implemented in the secure processing circuit; and
after having performed the first verification and the second verification, by sending an output signal towards an access management platform for purposes of triggering the requested access, wherein the terminal comprises:
a main processing circuit configured to at least partially manage a first application, the first application implementing at least the first verification upon reception of the code by the terminal.

13. A system for managing an access request coming from a requester and relating to access to a digital resource or relating to access to a connected device to control an operation, the system comprising:
a terminal configured to certify an identity and location of the requester by performing, upon reception of a code sent through at least one short-range telecommunication channel, a first verification of the location of the requester, on a basis of the code, by performing a second verification relating at least to the identity of the requester and implemented in a secure processing circuit; and, after having performed the first verification and the second verification, by sending an output signal towards an access management platform for purposes of triggering the requested access,
the connected device configured to receive the access request, and
the access management platform configured to receive the output signal coming from the terminal and to trigger, in response, the requested access.

* * * * *